US010487676B2

(12) United States Patent
Hughes

(10) Patent No.: US 10,487,676 B2
(45) Date of Patent: Nov. 26, 2019

(54) TURBINE HOUSING

(71) Applicant: Cummins Ltd, Huddersfield (GB)

(72) Inventor: Stephen Hughes, Stockport (GB)

(73) Assignee: Cummins Ltd., Huddersfield (GB)

( * ) Notice: Subject to any disclaimer, the term of this patent is extended or adjusted under 35 U.S.C. 154(b) by 510 days.

(21) Appl. No.: 15/184,270

(22) PCT Filed: Dec. 12, 2014

(86) PCT No.: PCT/GB2014/053693
§ 371 (c)(1),
(2) Date: Jun. 16, 2016

(87) PCT Pub. No.: WO2015/092373
PCT Pub. Date: Jun. 25, 2015

(65) Prior Publication Data
US 2017/0022830 A1   Jan. 26, 2017

(30) Foreign Application Priority Data

Dec. 16, 2013 (GB) .................................. 1322206.2

(51) Int. Cl.
*F01D 25/24* (2006.01)
*F01D 9/02* (2006.01)
*F02B 37/00* (2006.01)

(52) U.S. Cl.
CPC ............. *F01D 9/026* (2013.01); *F01D 25/24* (2013.01); *F02B 37/00* (2013.01);
(Continued)

(58) Field of Classification Search
CPC .......... F01D 9/026; F01D 25/24; F02B 37/00; F05D 2220/40; F05D 2250/38; Y02T 10/144
(Continued)

(56) References Cited

U.S. PATENT DOCUMENTS 2,041,570 A * 5/1936 Reiffenstein ............ F03B 3/186
                                                              415/129
2,518,660 A * 8/1950 Browne .................. F02B 37/04
                                                              123/41.06
(Continued)

FOREIGN PATENT DOCUMENTS

DE     102009056632 A1     6/2011
DE     102012205198 A1    10/2012
(Continued)

OTHER PUBLICATIONS

International Search Report and Written Opinion issued by the European Patent Office, dated Feb. 27, 2015, for related International Application No. PCT/GB2014/053693; 11 pages.

*Primary Examiner* — Justin D Seabe
*Assistant Examiner* — Brian Christopher Delrue
(74) *Attorney, Agent, or Firm* — Faegre Baker Daniels LLP

(57) ABSTRACT

A turbine housing has a cavity that defines a turbine axis, and has a volute. The volute comprises a volute passage spiralling radially inwards towards the cavity, a substantially annular throat positioned around the cavity between it and the volute passage, and a tongue terminating at a distal tongue tip. In a plane containing the turbine axis and the tongue tip, the throat defines a line of minimum clearance, the volute passage and tongue tip co-operatively define a preliminary inlet area, and the tongue tip defines a tongue tip lateral centerline. The line of minimum clearance and the preliminary inlet area co-operatively define a line of passage offset, which connects the centroid of the preliminary inlet area and a point half way along the line of minimum clearance. The line of passage offset is not perpendicular to the turbine axis, and the tongue tip lateral centerline and the (Continued)

line of passage offset define an angle therebetween of at least 60 degrees.

21 Claims, 7 Drawing Sheets

(52) U.S. Cl.
CPC ...... *F05D 2220/40* (2013.01); *F05D 2250/38* (2013.01); *Y02T 10/144* (2013.01)

(58) Field of Classification Search
USPC .............................. 415/205, 203, 204, 212.1
See application file for complete search history.

(56) References Cited

U.S. PATENT DOCUMENTS

| | | | | |
|---|---|---|---|---|
| 2,861,774 | A * | 11/1958 | Buchi | F01D 17/14 415/150 |
| 3,128,989 | A * | 4/1964 | Allingham | F01D 21/006 137/56 |
| 3,734,650 | A * | 5/1973 | Reisacher | F01D 9/026 415/205 |
| 4,027,994 | A * | 6/1977 | MacInnes | F01D 9/026 415/1 |
| 4,381,171 | A * | 4/1983 | Chapple | F01D 17/143 415/157 |
| 4,473,931 | A * | 10/1984 | Komatsu | F01D 9/026 29/527.6 |
| 4,512,714 | A * | 4/1985 | Kaesser | F01D 17/146 415/151 |
| 4,544,326 | A * | 10/1985 | Nishiguchi | F01D 9/026 415/151 |
| 4,678,397 | A * | 7/1987 | Komatsu | F01D 17/146 415/151 |
| 6,050,772 | A * | 4/2000 | Hatakeyama | F04D 29/283 29/888.024 |
| 6,260,358 | B1 * | 7/2001 | Daudel | F02B 37/02 415/42 |
| 7,043,913 | B2 * | 5/2006 | Nishiyama | F01D 9/026 415/205 |
| 7,931,437 | B1 * | 4/2011 | Johnson | F01D 9/026 415/184 |
| 9,874,222 | B2 * | 1/2018 | Yoshida | F02C 6/12 |
| 2003/0154717 | A1 * | 8/2003 | Schmid | F02B 37/02 60/605.2 |
| 2005/0056015 | A1 * | 3/2005 | Fledersbacher | F01D 9/026 60/602 |
| 2007/0089414 | A1 * | 4/2007 | Yokoyama | F01D 9/026 60/605.1 |
| 2010/0074744 | A1 * | 3/2010 | Phillips, Jr. | F01D 9/026 415/208.1 |
| 2011/0008162 | A1 * | 1/2011 | Yokoyama | F01D 9/026 415/204 |
| 2011/0232282 | A1 * | 9/2011 | Anschel | F01D 9/026 60/615 |
| 2011/0243721 | A1 * | 10/2011 | Alajbegovic | F01D 17/165 415/204 |
| 2011/0252789 | A1 * | 10/2011 | Kares | F01D 5/048 60/605.1 |
| 2011/0252790 | A1 * | 10/2011 | Lotterman | F02B 37/00 60/605.1 |
| 2013/0219885 | A1 * | 8/2013 | Watson | F01D 9/026 60/605.1 |
| 2013/0266432 | A1 * | 10/2013 | Iwakiri | F04D 29/441 415/204 |
| 2014/0294577 | A1 * | 10/2014 | Yoshida | F02C 6/12 415/204 |
| 2015/0023788 | A1 * | 1/2015 | Shoghi | F01D 25/24 415/208.1 |
| 2016/0003196 | A1 * | 1/2016 | Hang | F02B 37/22 60/605.2 |
| 2016/0025044 | A1 * | 1/2016 | Martinez-Botas | F01D 9/026 60/605.2 |
| 2016/0186568 | A1 * | 6/2016 | Faeth | F01D 9/026 415/170.1 |
| 2016/0230585 | A1 * | 8/2016 | Arnold | F01D 5/043 |
| 2017/0107896 | A1 * | 4/2017 | Gugau | F01D 5/048 |
| 2017/0183975 | A1 * | 6/2017 | Ausbrooks | F01D 9/026 |
| 2017/0204743 | A1 * | 7/2017 | Yokoyama | F02B 39/00 |

FOREIGN PATENT DOCUMENTS

| | | | | |
|---|---|---|---|---|
| EP | 2048326 | A2 | 4/2009 | |
| EP | 2657481 | A1 | 10/2013 | |
| JP | 59122726 | A * | 7/1984 | ............. F01D 9/026 |
| JP | 60032936 | A * | 2/1985 | ............. F01D 9/026 |
| JP | 2013142324 | A * | 7/2013 | ............... F02C 6/12 |
| JP | 2013142324 | A | 7/2013 | |
| WO | WO-2010047259 | A1 * | 4/2010 | ............. F01D 9/026 |

* cited by examiner

TURBINE HOUSING

CROSS-REFERENCE TO RELATED APPLICATION

The present application is a National Stage Application under 35 USC § 371 of PCT Application No. PCT/GB2014/053693, filed Dec. 12, 2014, which claims priority to U.K. Application No. 1322206.2, filed Dec. 16, 2013, the entire disclosures of which being hereby incorporated herein by reference.

TECHNICAL FIELD

The present disclosure relates to a turbine housing for a turbine assembly, and has particular, but not exclusive, application to turbochargers.

BACKGROUND

Turbochargers are well known devices for supplying air to the intake of an internal combustion engine at pressures above atmospheric (boost pressures). A conventional turbocharger comprises an exhaust gas driven turbine wheel, mounted on a rotatable shaft, within a turbine housing. Rotation of the turbine wheel rotates a compressor wheel, mounted on the other end of the shaft, within a compressor housing. The compressor wheel delivers compressed air to the engine intake manifold. The turbocharger shaft is conventionally supported by journal and thrust bearings, including appropriate lubricating systems, located within a central bearing housing connected between the turbine and compressor wheel housing.

The turbine stage of a conventional turbocharger comprises: a turbine housing defining a turbine chamber within which the turbine wheel is mounted; an annular throat defined in the housing between facing radially extending walls and arranged around the turbine chamber to form an inlet passage; and an outlet passage extending from the turbine chamber. These components communicate such that pressurised exhaust gas admitted to the housing flows through the throat to the outlet passage via the turbine chamber and rotates the turbine wheel. It is known to improve turbine performance by providing vanes, referred to as nozzle vanes, in the throat so as to deflect gas flowing through the throat towards the direction of rotation of the turbine wheel.

The turbines of known turbochargers may be of a fixed or variable geometry type. Variable geometry turbines differ from fixed geometry turbines in that the size of the throat can be varied to optimise gas flow velocities over a range of mass flow rates so that the power output of the turbine can be varied in line with varying engine demands.

In one known type of variable geometry turbine, an axially moveable wall member defines one wall of the throat. The position of the movable wall member relative to a fixed facing wall of the throat is adjustable to control the axial width of the throat. Thus, for example, as exhaust gas flow through the turbine decreases, the throat width may be decreased to maintain the gas velocity and optimise turbine output. The axially movable wall member may be a "nozzle ring" that is provided with vanes that extend into the throat and through orifices provided in a "shroud plate" that defines the fixed facing wall of the throat, the orifices being designed to accommodate movement of the nozzle ring relative to the shroud. Typically the nozzle ring may comprise a radially extending wall (defining one wall of the throat) and radially inner and outer axially extending walls or flanges that extend into an annular cavity behind the radial face of the nozzle ring. The cavity is formed in a part of the turbocharger housing (usually either the turbine housing or the turbocharger bearing housing) and accommodates axial movement of the nozzle ring. The flanges may be sealed with respect to the cavity walls to reduce or prevent leakage flow around the back of the nozzle ring. In one common arrangement the nozzle ring is supported on rods extending parallel to the axis of rotation of the turbine wheel and is moved by an actuator, which axially displaces the rods. In an alternative type of variable geometry turbocharger, the nozzle ring is fixed and has vanes that extend from a fixed wall through orifices provided in a moving shroud plate.

In another type of variable geometry turbine known as a swing vane turbocharger, the inlet size (or flow size) of the turbine is controlled by an array of movable vanes positioned in the turbine inlet. Each vane can pivot about an axis extending across the inlet parallel to the turbocharger shaft and aligned with a point approximately half way along the length of the vane. A vane actuating mechanism is linked to each of the vanes and is displaceable in a manner which causes each of the vanes to move in unison, such a movement enabling the cross sectional area available for the incoming gas and the angle of approach of the gas to the turbine wheel to be controlled.

It is known to provide a turbocharger turbine with a valve-controlled bypass port referred to as a wastegate, to enable control of the turbocharger boost pressure and/or shaft speed. A wastegate valve (typically a poppet type valve) is controlled to open the wastegate port (bypass port) when the boost pressure of the fluid in the compressor outlet reaches a pre-determined upper limit, thus allowing at least some of the exhaust gas to bypass the turbine wheel. Typically the wastegate port opens into a wastegate passage which diverts the bypass gas flow to the turbine outlet or vents it to the atmosphere. The wastegate valve may be actuated by a variety of means, including electric actuators, but is more typically actuated by a pneumatic actuator operated by boost pressure delivered by the compressor wheel.

Some known internal combustion engines include Exhaust Gas Recirculation (EGR). EGR is used to reduce nitrogen oxide (NOx) emissions of an internal combustion engine. EGR works by recirculating a portion of an exhaust gas produced by the internal combustion engine back to the engine cylinders, usually via the engine intake manifold. Recirculating a portion of the exhaust gas results in a reduction in temperature of the combustion which occurs in the engine cylinders. Because NOx production requires a mixture of nitrogen and oxygen (as found in the air) to be exposed to high temperatures, the lower combustion temperatures resulting from EGR reduces the amount of NOx generated by the combustion. In some known internal combustion engines a variable geometry turbine assembly (which forms part of a turbocharger) is used to increase the pressure (also known as back pressure) of the exhaust gas by partially closing the throat. This creates a pressure differential between the exhaust gas and the engine intake such that the exhaust gas will flow via an exhaust gas recirculation channel to the engine intake. However, the creation of back pressure by the variable geometry turbine can impair the operating performance of the internal combustion engine.

Exhaust gas is generally admitted to the throat of a turbocharger turbine through an inlet volute provided within the turbine housing. The inlet volute has a volute passage which spirals radially inwards from a first end to a second end and terminates at the throat. Exhaust gas from the exhaust manifold of an engine enters the volute passage at the first end, and emerges at the throat at significant angular velocity. The volute passage generally decreases in cross section along its length, so as to increase the velocity of the exhaust gas flow therethrough (and thereby increase the amount of energy which can be extracted by the turbine wheel) and/or to increase the pressure in the volute passage so that exhaust gas is urged out of the passage and into the throat.

Though some turbines utilize a single inlet volute, known turbines such as double flow turbines and twin flow turbines utilize two inlet volutes each including a separate volute passage. The two volute passages are separated by a dividing wall and each has a separate throat. The two passages' throats meet at an inlet passage radially adjacent to the turbine, with different portions of the inlet passage being supplied by the different volute passages. In the case of a twin flow turbine each volute passage supplies a different axial portion of the inlet passage, and in the case of a double flow turbine each volute passage supplies a different circumferential portion of the inlet passage. In other words, in a double flow turbine the two volute passages meet the inlet passage in the same plane, whereas in a twin flow turbine the two volute passages meet the inlet passage in axially adjacent planes.

One advantage of twin flow and double flow turbines is that they allow the segregation of the exhaust gas flows from the engine cylinders which flows would otherwise interfere with each other. Where exhaust from all cylinders feeds a single volute passage, all engine cylinders are connected together by the exhaust manifold. An exhaust gas flow pulse from a first cylinder at the end of its firing stroke and the start of its exhaust stroke can therefore increase the local pressure in the exhaust manifold near a second cylinder which is at the end of its exhaust stroke and the start of its intake stroke (i.e. during its overlap period, in which the intake and exhaust valves of that cylinder are both partially open so that exhaust scavenging can occur), preventing full expulsion of exhaust gas therefrom. In twin flow or double flow turbines, however, this first cylinder can be connected to one volute passage and the second cylinder can be connected to the other. The exhaust flow from these two cylinders is therefore partitioned (by the dividing wall between the volute passages) until it enters the turbine inlet passage. This reduces or eliminates interference with exhaust scavenging processes. This more efficient use of scavenging decreases exhaust gas temperatures (and therefore NOx production), and improves turbine efficiency (thereby reducing turbo lag and increasing boost pressures).

Double flow and twin flow turbines may also provide benefits in relation to EGR. By increasing the number of engine cylinders connected to one of the volute passages, and/or by reducing the cross sectional area of the passage, the exhaust pressure in that volute passage can be increased. This allows the local pressure in one volute passage to be increased to the point where (by connecting the exhaust recirculation channel to this passage) the recirculated exhaust can be supplied at sufficient pressure with a smaller rise in the overall exhaust pressure (and thus a smaller negative effect on engine performance).

In conventional turbochargers, the or each inlet volute has a tongue which projects along a longitudinal axis running substantially within a plane that is normal to the turbine axis. The tongue projects between, and acts to partition, the second end of the volute passage from a part of the passage immediately radially adjacent thereto. While many volute passages do not rotate far beyond 360° around the turbine axis, in figurative terms the tongue can be considered to separate at least the end of the radially innermost 'coil' of the passage (i.e. at least the second end of the passage) from the penultimate coil. The tongue terminates in a longitudinally distal tip, which is conventionally positioned radially adjacent to the turbine wheel to provide minimal clearance therewith, and acts to direct working fluid in the second end of the passage into the turbine wheel. In conventional turbines the exhaust gas runs into the turbine wheel radially (i.e. with no axial velocity component), so conventional turbine wheels are designed to be most efficient when their inflow has no axial component. Conventionally, therefore, the lateral centerline of the tongue tip is positioned transverse to this direction (i.e. parallel to the turbine axis) so that the radially inner surface of the tongue tip urges fluid into the turbine wheel accordingly (rather than imparting an axial velocity component, as it would if aligned at an angle to the turbine axis). Further, the casting processes by which the turbine housing is manufactured may be more simple if the lateral centerline of the tongue tip is parallel to the turbine axis.

A key parameter in turbine design is the swirl angle (also known as whirl angle), which is the angle between the radial direction and the direction in which fluid enters the turbine wheel. For instance, if fluid enters a turbine radially then it has a swirl angle of zero, and if it enters a turbine wheel tangentially it has a swirl angle of 90°. The swirl angle in the turbine of a turbocharger is typically between around 20° and around 40°. The swirl angle at a particular angular position about the turbine axis can be defined as:

$$\alpha = \tan\left(\frac{A_{wheel}/r_{wheel}}{A_{passage}/r_{passage}}\right)$$

Where α is swirl angle, Awheel is the area of the wheel (in circumferential cross section), rwheel is the radial distance to the centroid of Awheel, Apassage is the area of the volute passage at the angular position in question and rpassage is the radial distance to the centroid of that area.

In some applications, $A_{passage}/r_{passage}$ (hereafter referred to merely as 'A/r'), preferably decreases linearly around the turbine axis. This can be useful in controlling the swirl angle so as to optimize the mass flow of working fluid into the turbine. For most angular positions about the circumference of the turbine wheel this can be achieved by adjusting the size and shape of the volute passage. However, problems can arise in the region of the tongue tip. As working fluid running along the volute passage passes the tip of the tongue there is a sudden increase in the area of the passage and the shape of that area (since the tongue no longer occupies any space in the passage). This can lead to a sudden change in the A/r and therefore in the swirl angle. This localized change in swirl angle can create a localized area of high/low force on the turbine wheel around its circumference. This, in turn, can reduce the efficiency of the turbine (for instance by inducing vibration of the turbine wheel) and/or lead to premature failure (for instance from fatigue due to a point on the turbine undergoing increased cyclic loading as it continually travels around the turbine axis and through the localized region). For the reasons discussed below, this problem can be particularly acute in turbochargers where the volute is axially asymmetric (such as twin flow turbines and some double flow turbines), which can lead to such turbines being rejected for use in applications to which they would otherwise be well suited.

SUMMARY

It is one object of the disclosure to obviate or mitigate at least one of the aforesaid disadvantages, and/or to provide an improved or alternative turbine housing, turbine assembly or turbocharger.

According to a first aspect of the present disclosure there is provided a turbine housing comprising a cavity for a turbine wheel, the cavity defining a turbine axis about which the turbine wheel rotates in use, and an inlet volute comprising: a volute passage spiralling radially inwards about the turbine axis from a first end to a second end; a substantially annular throat positioned between a radially inner portion of the volute passage and a radially outer portion of the cavity to provide fluid communication therebetween, the throat being defined between first and second axially-spaced walls; a tongue projecting between a radially outer portion of the second end of the volute passage and a radially inner portion of a part of the volute passage radially outboard thereof, the tongue terminating at a distal tongue tip, wherein the volute passage, throat and tongue tip are positioned whereby in a plane containing the turbine axis and the tongue tip: the throat defines a line of minimum clearance, which is a line running between the points on the first and second walls which are the closest together; the volute passage and tongue tip co-operatively define a preliminary inlet area; the line of minimum clearance and the preliminary inlet area co-operatively define a line of passage offset, which connects the centroid of the preliminary inlet area and a point half way along the line of minimum clearance; the tongue tip defines a tongue tip lateral centerline; the line of passage offset is not perpendicular to the turbine axis; and the tongue tip lateral centerline and the line of passage offset define an angle therebetween of at least 60 degrees.

With the tongue tip lateral centerline arranged relative to the line of passage offset in this way, the total cross sectional area of the tongue tip may be reduced, which may in turn reduce the fluctuations in A/r across the tongue. Instead or in addition, this tongue positioning may allow the radially inner and outer surfaces of the tongue to be a more similar size to one another, which may reduce the magnitude of fluctuations in pressure of fluid flow passing over the tongue tip. Either of these effects may allow the force applied to the turbine by the fluid to be more constant, which may improve turbine efficiency and/or reduce turbine wheel fatigue.

In some embodiments, the circumferential extent of the tongue is the same across its lateral width (in other words the tongue has a 'flat' tip). For the avoidance of doubt, where the circumferential extent of the tongue varies along its lateral width (e.g. if the longitudinal extremity of the tongue is rounded or pointed), the tongue tip may be considered to be the point at which the tongue has narrowed to 80% of its original lateral width, and the plane containing the turbine axis and the tongue tip is the plane which contains the turbine axis and passes through this point on the tongue.

It will be apparent that two lines in a plane necessarily define an angle therebetween of between 0 and 90 degrees. Reference to the angle between the tongue tip lateral centerline and the line of passage offset refers to this angle, rather than any obtuse angle also defined. For instance, a turbine housing where the tongue tip lateral centerline and the line of passage offset are at an angle of 45 degrees falls outside the first aspect of the disclosure, even though it may be considered that the tongue tip lateral centerline and the line of passage offset also define an angle of 135 degrees. The same applies in relation to other angles described herein.

The preliminary inlet area is the cross sectional area enclosed by the volute passage and tongue tip in the plane containing the turbine axis and the tongue tip. For the avoidance of doubt, reference to the tongue tip defining a lateral centerline is not intended to imply that the tongue tip is necessarily symmetrical.

In some arrangements, there may be several pairs of points on the first and second walls which are each spaced apart by the same distance (this distance being the minimum clearance between the walls). In such arrangements the line of minimum clearance may be considered to run between any such pair of points. Alternatively, it may be considered to run between the pair of points which are nearest to the cavity.

The line of passage offset may be positioned at an angle of no more than 80 degrees to the turbine axis. For instance, the line of passage offset may be positioned at an angle of no more than 75 degrees, no more than 70 degrees, no more than 60 degrees or no more than 50 degrees to the turbine axis.

As discussed below, if line of passage offset is perpendicular then the effect of the tongue tip on the change in A/r is more manageable. It follows that in some circumstances the smaller the angle between the line of passage offset and the turbine axis (i.e. the further from perpendicular the line of passage offset is to the turbine axis), the greater the advantage provided by the present disclosure may be. The line of passage offset being further from perpendicular to the turbine axis may also allow the inlet volute to be moved further to one side of the turbine housing, thereby providing more room for other components (such as lubricant conduits to and from a bearing housing to which the turbine housing may be mounted or the bearing housing itself, or components of a body in proximity to the turbine housing such as ducts or cables running to or from an engine).

The tongue tip lateral centerline and the line of passage offset may define an angle therebetween of at least 75 degrees, preferably at least 80 degrees, and more preferably at least 85 degrees.

One or more of the benefits of the first aspect of the disclosure may be increased by positioning the tongue tip lateral centerline and line of passage offset nearer to perpendicular to each other.

The sum of the angle at which the tongue tip lateral centerline intersects the first wall, and the angle at which the tongue tip lateral centerline intersects the second wall, may be at least 120 degrees.

According to a second aspect of the present disclosure there is provided a turbine housing comprising a cavity for a turbine wheel, the cavity defining a turbine axis about which the turbine wheel rotates in use, and an inlet volute comprising: a volute passage spiralling radially inwards about the turbine axis from a first end to a second end; a substantially annular throat positioned between a radially inner portion of the volute passage and a radially outer portion of the cavity to provide fluid communication therebetween, the throat being defined between first and second axially-spaced walls; a tongue projecting between a radially outer portion of the second end of the volute passage and a radially inner portion of a part of the volute passage radially outboard thereof, the tongue terminating at a distal tongue tip, wherein the volute passage, throat and tongue tip are positioned whereby in a plane containing the turbine axis and the tongue tip: the throat defines a line of minimum clearance, which is a line running between the points on the first and second walls which are the closest together; the tongue tip defines a tongue tip lateral centerline; and the sum of the angle at which the tongue tip lateral centerline intersects the first wall, and the angle at which the tongue tip lateral centerline intersects the second wall, is at least 120 degrees.

As outlined above, the sum of said angles reflects the extent to which the tongue tip is positioned perpendicularly to the first and second walls. The tongue tip lateral centerline being positioned nearer to perpendicular to first and second walls may reduce the cross sectional area of the tongue tip, and/or may allow the radially inner and outer surfaces of the tongue tip to be a more similar size to one another. This may reduce the magnitude of fluctuations in A/r and/or pressure across the tongue to be reduced, thereby improving turbine efficiency and/or turbine wheel fatigue life, as described in relation to the first aspect of the disclosure.

As outlined above, it is to be noted that two lines in a plane necessarily define an angle therebetween of between 0 and 90 degrees. Reference to the angle between the tongue tip lateral centerline and the first wall or second wall refers to this angle, rather than any obtuse angle also defined. Accordingly, the sum of said angles is necessarily between 0 and 180 degrees.

Where in a turbine housing according to the disclosure said sum of angles is at least 120 degrees, said sum may be at least 140 degrees, at least 150 degrees or at least 155 degrees. Said sum of angles may be at least 160 degrees, at least 170 degrees or at least 175 degrees. This may enhance one or more of the above advantages.

The tongue tip lateral centerline may be positioned substantially perpendicularly to the first wall, at a location at which it is as close to perpendicular to the second wall as possible. For instance, during the design process for a turbine housing according to the disclosure, the desired position of a tongue tip may be determined by constraining its position so that the tongue tip lateral centerline intersects the first wall at substantially 90 degrees, before moving the position of the tongue tip along the first wall (in the aforementioned plane) to the position in which its lateral centerline would intersect the second wall at as large an angle as possible.

The tongue tip lateral centerline may be positioned substantially perpendicularly to the first wall, at a location at which its lateral centerline is as short as possible. For instance, during the design process for a turbine housing according to the disclosure, the desired position of a tongue tip may be determined by constraining its position so that the tongue tip lateral centerline intersects the first wall at substantially 90 degrees, before moving the position of the tongue tip along the first wall (in the aforementioned plane) to the position in which its lateral extent is minimised.

The tongue tip lateral centerline may be positioned at an angle of at least 60 degrees, for example at least 65 degrees, at least 70 degrees, at least 75 degrees, at least 80 degrees or at least 85 degrees, to the first wall. Instead or in addition, the tongue tip lateral centerline may be positioned at an angle of at least 60 degrees, for example at least 65 degrees, at least 70 degrees, at least 75 degrees, at least 80 degrees or at least 85 degrees, to the second wall.

The tongue may be positioned so that the sum of the angles at which the tongue tip lateral centerline is positioned relative to the first and second walls is at least 130 degrees, for instance at least 150 degrees, at least 160 degrees, at least 170 degrees or at least 175 degrees. For the avoidance of doubt, the sum of the angles at which the tongue tip lateral centerline is positioned relative to the first and second walls is the angle at which the tongue tip lateral centerline intersects the first wall, plus the angle at which the tongue tip lateral centerline intersects the second wall. In one embodiment, the tongue may be positioned so that the sum of the angles at which the tongue tip lateral centerline is positioned relative to the first and second walls is as large as the geometry of the turbine housing will allow.

The tongue tip may be laterally tapered. For instance, a portion of the tongue tip which is adjacent to the first wall may be thicker than a portion which is adjacent to the second wall. The tongue tip being laterally tapered, for instance by around 2 degrees, is commonplace as this can simplify the casting of a turbine housing. The tongue tip may or may not taper evenly along its lateral extent. For instance it may be convex or concave in lateral cross-section. For the avoidance of doubt, a tongue tip may be considered to be laterally tapered even if it intersects the first and/or second wall at a filleted or chamfered junction.

The turbine housing may have a mounting surface configured to be positioned against a bearing housing, and the first wall may be positioned axially further from the mounting surface than the second wall.

In some arrangements the first and second walls may axially overlap, and/or the axial extent of the first and second walls may be difficult to determine. In such circumstances the wall which is axially further from the mounting surface may be determined by comparing the points on the walls between which the line of minimum clearance runs. The one of said points which is axially nearer the mounting surface may be considered to be provided by the wall which is axially nearer the mounting surface.

The tongue tip lateral centerline may be at an angle of no more than 25 degrees to the line of minimum clearance, for instance it may be no more than 20 degrees to the line of minimum clearance. Indeed, the tongue tip lateral centerline may be at an angle of 15 degrees or less to the line of minimum clearance, is preferably at an angle of 10 degrees or less to the line of minimum clearance, and is more preferably at an angle of 5 degrees or less to the line of minimum clearance.

The line of minimum clearance may lie substantially within the tongue tip. In such a case, the line of minimum clearance and the tongue tip lateral centerline are preferably substantially collinear.

With part of the tongue tip being positioned at the narrowest part of the throat in this manner, the lateral width of the tongue can be minimised. This reduces the overall cross sectional area of the tongue tip, thereby reducing the change in A/r across it.

As the tongue tip may obscure the shape of a portion of the throat in the plane containing the turbine axis and the tongue tip, in some situations it may not be possible to directly visually determine the position of the line of minimum clearance. For the avoidance of doubt, in such arrangements the position of the line of minimum clearance can be determined by interpolation. For instance, where the shape of the throat is substantially constant around its circumference its shape in the region occupied by the tongue tip can be readily inferred. Alternatively, the shape may be determined by interpreting the angle and curvature of the first and second walls radially above and below the tongue tip, and extrapolating the most likely overall shape.

The tongue tip lateral centerline may be at an angle of 15 degrees or less to the turbine axis, is preferably at an angle of 10 degrees or less to the turbine axis, and is more preferably at an angle of 5 degrees or less to the turbine axis.

Arranging the housing so that the tongue tip lateral centerline is at such an angle to the turbine axis (while also being at an angle of 60° or more to the line of passage offset) may allow the radially inner surface of the tongue to direct working fluid into the cavity (i.e. the turbine wheel) in a direction nearer to the radial direction, in order to improve turbine efficiency (as outlined above).

The housing may further comprise an additional inlet volute with an additional volute passage spiralling radially inwards about the turbine axis from a first end to a second end.

The housing comprising a second volute may provide one or more of the advantages discussed above, in relation to double flow and twin flow turbines.

The volute passage and the additional volute passage may be separated by a dividing wall.

The dividing wall may define the second wall of the throat. As an alternative, it may define the first wall of the throat.

The volute passage and the additional volute passage may be substantially mirror-images of each other about a plane normal to the turbine axis. This may allow the flow of working fluid into the turbine from both volute passages to be advantageously uniform.

The volute passage and the additional volute passage may be inclined in opposite axial directions. Where this is the case, the angles by which the volute passage and the additional volute passages are inclined (represented by the angles from the radial direction of the line of passage offset and the additional line of passage offset respectively) may or may not be of substantially the same magnitude. The volute passage and additional volute passage being inclined in opposite axial directions may allow the net flow entering the cavity to be nearer radial in direction, which can be advantageous in terms of efficiency of a turbine positioned within the cavity.

In one embodiment where the volute comprises an additional volute passage, the turbine housing further comprises: a substantially annular additional throat positioned between a radially inner portion of the additional volute passage and a radially outer portion of the cavity to provide fluid communication therebetween, the additional throat being defined between first and second axially-spaced walls; an additional tongue projecting between a radially outer portion of the second end of the additional volute passage and a radially inner portion of a part of the additional volute passage radially outboard thereof, the additional tongue terminating at a distal additional tongue tip, wherein the additional volute passage, additional throat and additional tongue tip are positioned whereby in a plane containing the turbine axis and the additional tongue tip: the additional throat defines an additional line of minimum clearance, which is a line running between the points on the first and second walls of the additional throat which are the closest together; the additional volute passage and the additional tongue tip co-operatively define an additional preliminary inlet area; the additional line of minimum clearance and the additional preliminary inlet area co-operatively define a line of additional passage offset, which connects the centroid of the additional preliminary inlet area and a point half way along the additional line of minimum clearance; the additional tongue tip defines an additional tongue tip lateral centerline; the line of additional passage offset is not perpendicular to the turbine axis; and the additional tongue tip lateral centerline and the line of additional passage offset define an angle therebetween of at least 60 degrees.

In the above embodiment the sum of the angle at which the additional tongue tip lateral centerline intersects the first wall of the additional throat, and the angle at which the additional tongue tip lateral centerline intersects the second wall of the additional throat, may be at least 120 degrees.

In a further embodiment where the volute comprises an additional volute passage, the turbine housing further comprises: a substantially annular additional throat positioned between a radially inner portion of the additional volute passage and a radially outer portion of the cavity to provide fluid communication therebetween, the additional throat being defined between two axially-spaced walls; an additional tongue projecting between a radially outer portion of the second end of the additional volute passage and a radially inner portion of a part of the additional volute passage radially outboard thereof, the additional tongue terminating at a distal additional tongue tip, wherein the additional volute passage, additional throat and additional tongue tip are positioned whereby in a plane containing the turbine axis and the additional tongue tip: the additional throat defines an additional line of minimum clearance, which is a line running between the points on the two axially-spaced walls of the additional throat which are the closest together; the additional volute passage and the additional tongue tip co-operatively define an additional preliminary inlet area; the additional line of minimum clearance and the additional preliminary inlet area co-operatively define a line of additional passage offset, which connects the centroid of the additional preliminary inlet area and a point half way along the additional line of minimum clearance; the additional tongue tip defines an additional tongue tip lateral centerline; the line of additional passage offset is not perpendicular to the turbine axis; and the additional tongue tip lateral centerline and the line of additional passage offset define an angle therebetween of at least 60 degrees.

In another embodiment where the volute comprises an additional volute passage, the turbine housing further comprises: a substantially annular additional throat positioned between a radially inner portion of the additional volute passage and a radially outer portion of the cavity to provide fluid communication therebetween, the additional throat being defined between first and second axially-spaced walls; an additional tongue projecting between a radially outer portion of the second end of the additional volute passage and a radially inner portion of a part of the additional volute passage radially outboard thereof, the additional tongue terminating at a distal additional tongue tip, wherein the additional volute passage, additional throat and additional tongue tip are positioned whereby in a plane containing the turbine axis and the additional tongue tip: the additional tongue tip defines an additional tongue tip lateral centerline; and the sum of the angle at which the additional tongue tip lateral centerline intersects the first wall of the additional throat, and the angle at which the additional tongue tip lateral centerline intersects the second wall of the additional throat, is at least 120 degrees.

Arrangements falling within the above embodiments may provide one or more of the advantages discussed above in relation to double flow and twin flow turbines, while also allowing both of the volutes to provide one or more of the advantages discussed above in relation to the first and second aspects of the disclosure.

One or more of the above optional features described in relation to the inlet volute may, instead or in addition to applying to the inlet volute, apply in relation to the additional volute.

In alternative embodiments the additional volute may have one or more, but less than all, of the above features.

The plane containing the turbine axis and the tongue tip, and the plane containing the turbine axis and the additional tongue tip, may be coplanar. This may allow any disruption to the A/r across the tongue to have a more limited circumferential extent. Alternatively, the plane containing the turbine axis and the tongue tip, and the plane containing the turbine axis and the additional tongue tip, may not be coplanar (for instance the plane containing the turbine axis and the tongue tip may intersect the plane containing the turbine axis and the additional tongue tip at an angle of at least 5 degrees, at least 10 degrees or at least 20 degrees). This may allow the circumferential positions of the two tongue tips to be staggered, which in turn may 'smooth' the changes in A/r around the circumference of the turbine. Further, it may allow a change in A/r across one tongue to be partially or entirely counteracted by a change in A/r across the other tongue.

The volute passage and additional volute passage may merge at a substantially annular inlet passage positioned immediately radially outwards from the cavity. The inlet passage may allow flow from the two volute passages to be combined with less resultant turbulence. The volute passage and the additional volute passage may instead be in direct fluid communication with respective portions of the cavity. This may advantageously reduce the amount of space occupied by the turbine housing.

The line of minimum clearance and the additional line of minimum clearance may be of substantially equal length. This may allow the flow into the cavity (or the inlet passage, where present) to be more even and therefore less turbulent. Alternatively, the line of minimum clearance and the additional line of minimum clearance may differ from one another in length. This may allow the fluid flow through each throat to be optimised separately, (for instance to provide faster flow into a turbine at some axial positions than at others).

The preliminary inlet area and the additional preliminary inlet area may not be of equal magnitude. In other words, the preliminary inlet area and the additional preliminary inlet area may differ from one another in magnitude. Their magnitudes may differ from one another by at least 5%, at least 10% or at least 20% of the larger of the two areas. This may allow one of the volute passages to be utilised for EGR with reduced overall exhaust back pressure, as outlined above. The volute with the smaller preliminary inlet area may also be used to provide advantageously increased flow velocity through a wastegate, due to the presence of higher pressure therein. Alternatively, the preliminary inlet area and the additional preliminary inlet area may have substantially the same cross-sectional area.

The tongue tip lateral centerline (and/or the additional tongue tip lateral centerline, where present) may be positioned at a radial distance from the turbine axis of around 1.1-1.3 times the radius of the turbine wheel.

The first and second walls may be movable relative to one another so as to adjust the distance therebetween. For instance, the turbine housing may have a movable shroud plate or nozzle ring as described above.

According to a third aspect of the present disclosure there is provided a turbine assembly comprising a turbine wheel, and a turbine housing according to the first aspect of the disclosure.

A turbine assembly according to the third aspect of the disclosure may provide a complete assembly which may be fitted to an apparatus so as to provide one or more of the advantages discussed in relation to the first and second aspects of the disclosure.

According to a fourth aspect of the present disclosure there is provided a turbocharger comprising a turbine assembly according to the third aspect of the disclosure.

A turbocharger according to the fourth aspect of the disclosure may provide a self-contained unit which provides one or more of the advantages discussed in relation to the first and second aspects of the disclosure.

According to a fifth aspect of the present disclosure there is provided a turbine housing comprising a cavity for a turbine wheel, the cavity defining a turbine axis about which the turbine wheel rotates in use, and an inlet volute comprising: a volute passage spiralling radially inwards about the turbine axis from a first end to a second end; a substantially annular throat positioned between a radially inner portion of the volute passage and a radially outer portion of the cavity to provide fluid communication therebetween, the throat being defined between two axially-spaced walls; a tongue projecting between a radially outer portion of the second end of the volute passage and a radially inner portion of a part of the volute passage radially outboard thereof, the tongue terminating at a distal tongue tip, wherein the volute passage, throat and tongue tip are positioned whereby in a plane containing the turbine axis and the tongue tip: the throat defines a line of minimum clearance, which is a line running between the points on the two axially-spaced walls which are the closest together; the volute passage and tongue tip co-operatively define a preliminary inlet area; the line of minimum clearance and the preliminary inlet area co-operatively define a line of passage offset, which connects the centroid of the preliminary inlet area and a point half way along the line of minimum clearance; the tongue tip defines a tongue tip lateral centerline; the line of passage offset is not perpendicular to the turbine axis; and the tongue tip lateral centerline and the line of passage offset define an angle therebetween of at least 60 degrees.

One or more of the optional features discussed in relation to the first or second aspect of the disclosure may also be applicable to the fifth aspect of the disclosure. Further, a turbine housing according to the fifth aspect of the disclosure may form part of a turbine assembly which also comprises a turbine wheel. Such a turbine assembly may form part of a turbocharger.

BRIEF DESCRIPTION OF THE DRAWINGS

Specific embodiments of the present disclosure will now be described, by way of example only, with reference to the accompanying drawings (not to scale), in which.

DETAILED DESCRIPTION OF EMBODIMENTS

Figure 1:
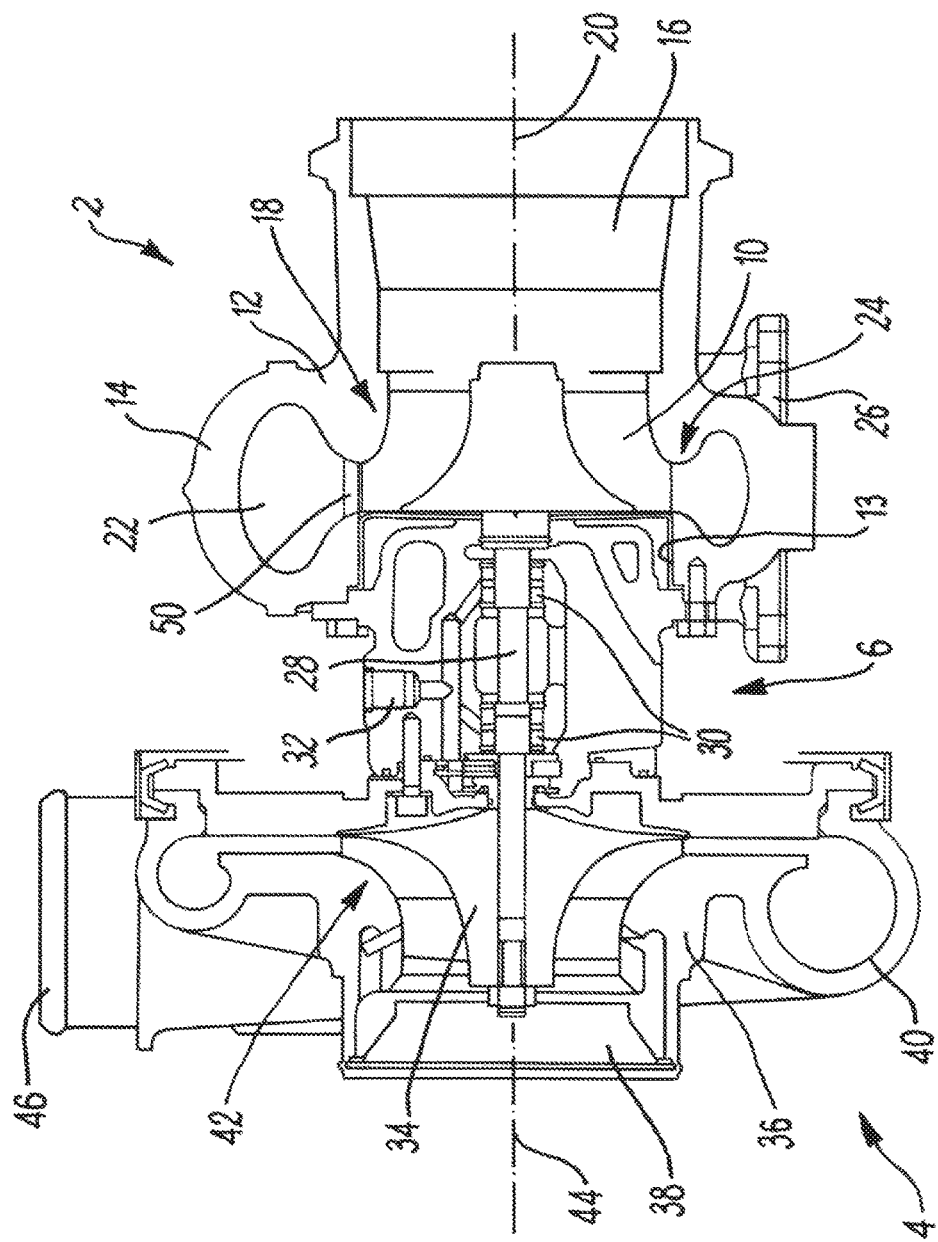
FIG. 1 shows a schematic longitudinal cross-section through a known turbocharger.

FIG. 1 shows a known turbocharger, which has a turbine assembly 2 joined to a compressor assembly 4 by a bearing housing 6. The turbine assembly 2 has a turbine wheel 10 and a turbine housing 12. The turbine housing 12 has a mounting surface 13, which in this case is annular in shape, that is positioned against the bearing housing 6. In other embodiments the mounting surface 13 may take a different form, for instance a flat or concave surface provided on a mounting flange.

The turbine housing 12 has an inlet volute 14, an outlet passage 16, and a cavity 18 which defines a turbine axis 20. The turbine wheel 10 is located within the cavity 18 and is rotatable about the turbine axis 20. The inlet volute 14 defines a volute passage 22 which spirals radially inwards from a first end to a second end (not visible in FIG. 1), and terminates at an annular throat 24 which is immediately radially outwards of the cavity 18. The volute passage 22, throat 24, cavity 18 and outlet passage 16 are arranged in fluid communication so that working fluid (in this case exhaust gas) enters the volute passage 22 at its first end, emerges from the second end of the volute passage into the throat 24, then passes from the throat to the outlet passage 16 through the cavity 18 (thereby imparting energy to the turbine wheel 10). The inlet volute 14 has a flange 26 positioned at the first end of the volute passage 16, for connection to the exhaust manifold of an internal combustion engine (not shown).

The turbine wheel 10 is mounted on one end of a shaft 28 which is positioned in line with the turbine axis 20 and rotatably received within bearings 30 in the bearing housing 6. The bearings 30 are connected to a lubricant port 32, through which lubricant is fed while the turbocharger is in use. When energy is imparted to the turbine wheel 10 by exhaust gas flowing through the cavity 18 from the throat 24 to the outlet passage 16, the turbine wheel rotates within the cavity and rotates the shaft 28.

The compressor assembly 4 has a compressor wheel 34 and a compressor housing 36. The compressor housing 36 has an inlet passage 38, an outlet volute 40, and a cavity 42 within which the compressor wheel 34 is located. The cavity 42 defines a compressor axis 44, which is in line with the turbine axis 20. The outlet volute 40 spirals radially outwards from the cavity 42 and terminates in a hose connector 46 for connection to the air intake of an engine (not shown). The compressor wheel is also mounted on the shaft 28, so that as the shaft is rotated by the turbine, the compressor wheel is rotated similarly. The inlet passage 38, cavity 42 and outlet volute 40 are arranged in fluid communication so that atmospheric air is sucked through the inlet passage 38 and into the cavity 42 by rotation of the compressor wheel 34, before being forced out of the compressor wheel, under pressure, through the outlet volute 40.

Figure 2:
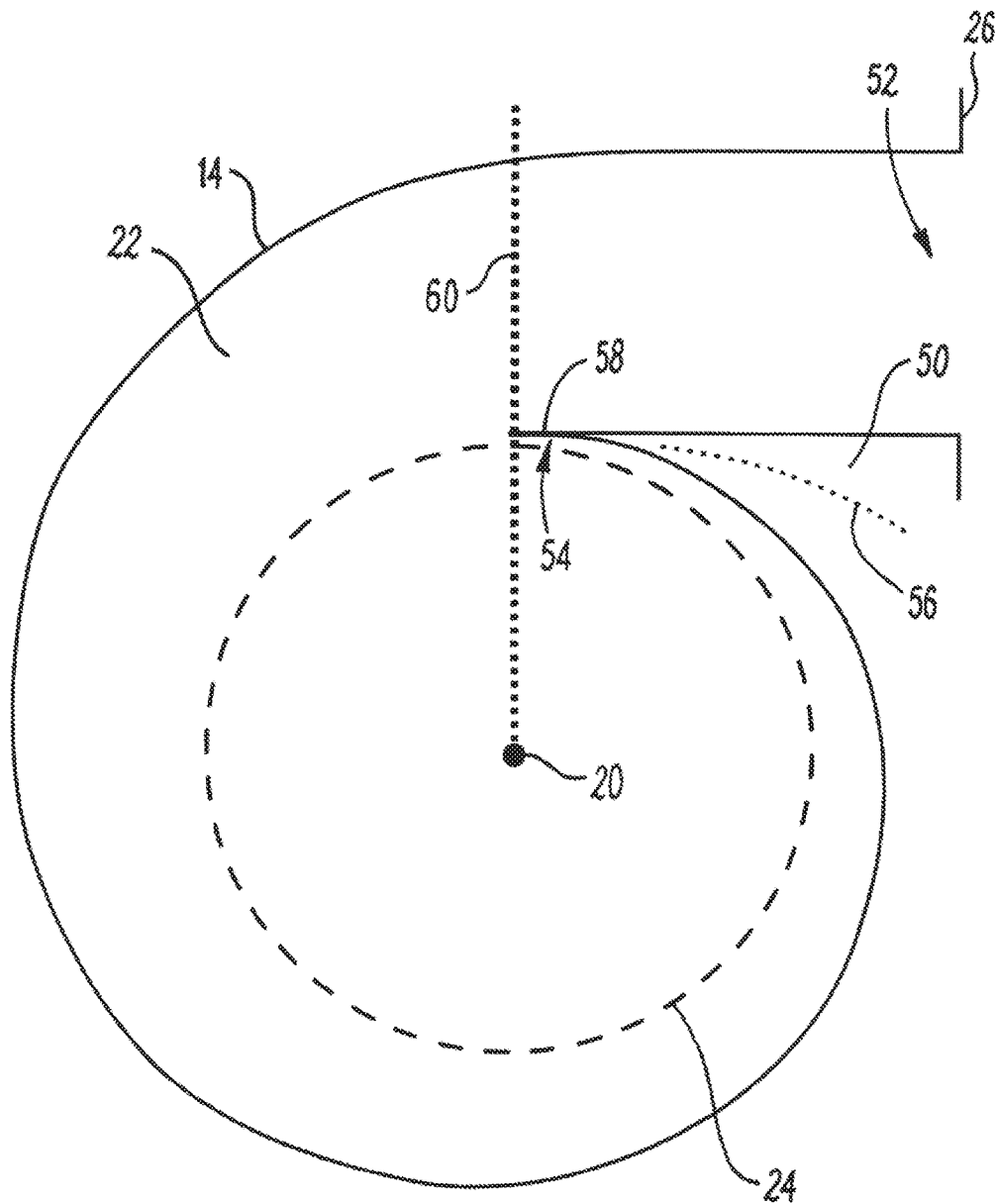
FIG. 2 shows an axial cross-section through the turbocharger of FIG. 1.

Returning to the turbine assembly 2, the inlet volute 14 also has a tongue 50, which is shown more clearly in FIG. 2. This figure shows the inlet volute 14, and the volute passage 22 spiralling radially inwards (about the turbine axis 20) towards the throat 24 from its first end 52 to its second end 54. The tongue 50 projects along its longitudinal axis 56, which runs within a plane that is normal to the turbine axis (i.e. the plane of the cross section shown in this figure), and terminates in a longitudinally distal tongue tip 58. As outlined above, the tongue acts to separate a radially outer portion of the second end 54 of the volute passage 22 from a radially inner portion of a part of the volute passage radially outboard from and adjacent to the second end (which in this case is a portion near to the first end 52). As also outlined above, the tongue tip 58 acts to direct flow of exhaust gas in the second end 54 of the volute passage 22 into the throat 24.

The potential sudden change in A/r described previously may be more apparent from FIG. 2. As exhaust gas flow runs through the first end 52 of the volute passage 22 (from right to left from the perspective of FIG. 2) and begins to spiral (anticlockwise from the perspective of FIG. 2) inwards towards the throat 24, it crosses an imaginary line 60. At that point, the radially inner boundary of the volute passage that was provided by the radially outer surface of the tongue is no longer present. The total cross-sectional area of the volute passage 22 at that point (Apassage) therefore increases due to the tongue no longer occupying space and enclosing the passage, and similarly the shape of that area (and thus the (radial) position of the centroid, rpassage) changes. Depending on the magnitudes of these changes, this can bring about the sudden change in A/r described above.

In the case of the volute shown in FIGS. 1 and 2, the effect of the change in cross sectional area across the tip of the tongue is manageable, however in other circumstances the effect can be more dramatic.

Figure 3:
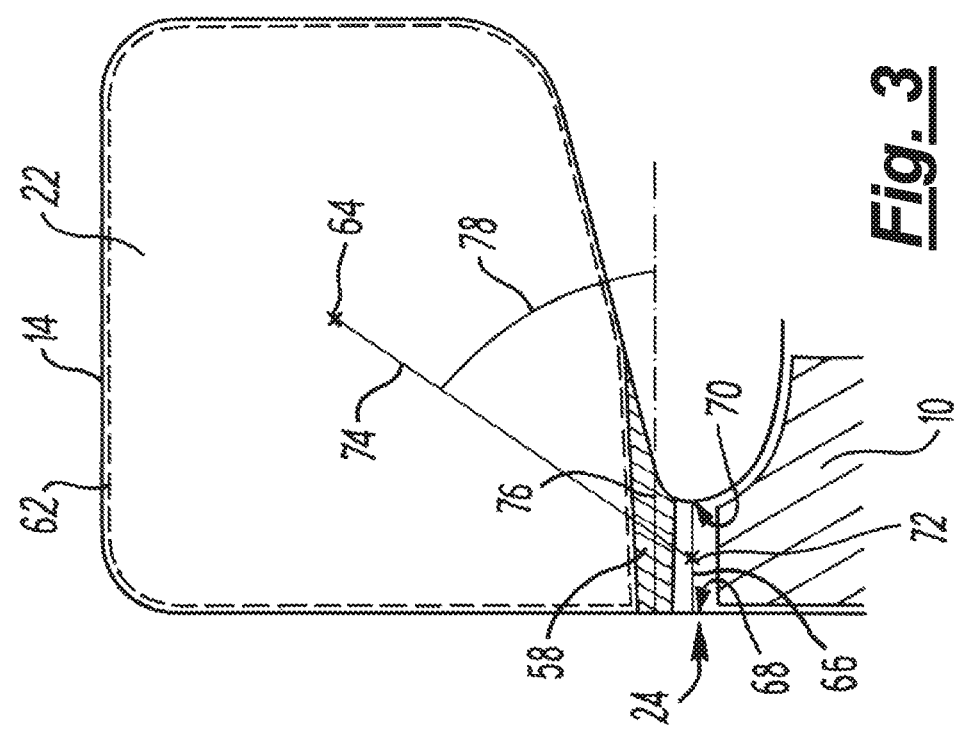
FIG. 3 shows a cross-section through an exemplary inlet volute.

FIG. 3 shows a cross-section of an inlet volute 14 where the volute passage 22 has been moved along the turbine axis (not visible, but running horizontally and positioned downwards from the perspective of FIG. 3) away from the mounting surface and bearing housing (not visible, but positioned to the left from the perspective of FIG. 3). As such, the throat 24 is no longer positioned at the axial centre of the volute passage 22. Such a change of position of the volute passage 22 can be necessary if the passage is large enough that it would otherwise obstruct access to the bearing housing (for instance for connection of lubricant lines to a lubricant port).

The cross-section of FIG. 3 is taken in a plane that contains the turbine axis (not visible) and the tongue tip 58 (i.e. a plane at the same angular position as the dotted line in FIG. 2). It also shows the preliminary inlet area 62, which is the cross-sectional area enclosed by the walls of the volute passage 22 and the tongue tip 58, and the centroid 64 of this area. In addition, FIG. 3 shows the line of minimum clearance 66, which is the shortest distance between the two axially-spaced counterposed walls 68, 70 that define the throat 24. In other words, the line of minimum clearance 64 is a line which runs between the points on the two walls 68, 70 which are the closest together. The mid-point 72 of the line of minimum clearance 66, that is the point which is half-way along the line of minimum clearance (and which is therefore equidistant between the walls 68, 70), is also marked on this drawing.

While the volute passage shown in FIGS. 1 and 2 is axially symmetrical, as outlined above the volute passage 22 shown in FIG. 3 is not. As a result, while in the passage shown in FIGS. 1 and 2 the centroid of the preliminary inlet area would be directly radially outwards from (i.e. axially aligned with) the mid-point of the line of minimum clearance of the throat, this is not the case for the volute passage 22 of FIG. 3. The centroid 64 of the preliminary inlet area 62 is axially displaced from the mid-point 72 of the line of minimum clearance 66. As such, a line connecting these two points 64, 72, hereafter referred to as the line of passage offset 74, is not perpendicular to the turbine axis as it would be in the volute passage of FIGS. 1 and 2.

With the volute passageway positioned so that the line of passage offset 74 is not perpendicular to the turbine axis, and the tongue tip 58 positioned so that its lateral centerline 76 is parallel to the turbine axis (i.e. transverse to the radial direction) as is conventional, the lateral centerline of the tongue tip is at a relatively acute angle to the line of passage offset 74. In this example, the angle 78 between the lateral centerline 58 of the tongue tip 58 and the line of passage offset 74 is 56°. Due to this relatively acute angle 78, the sudden change in A/r across the tongue tip 58 is more pronounced.

Figure 4:
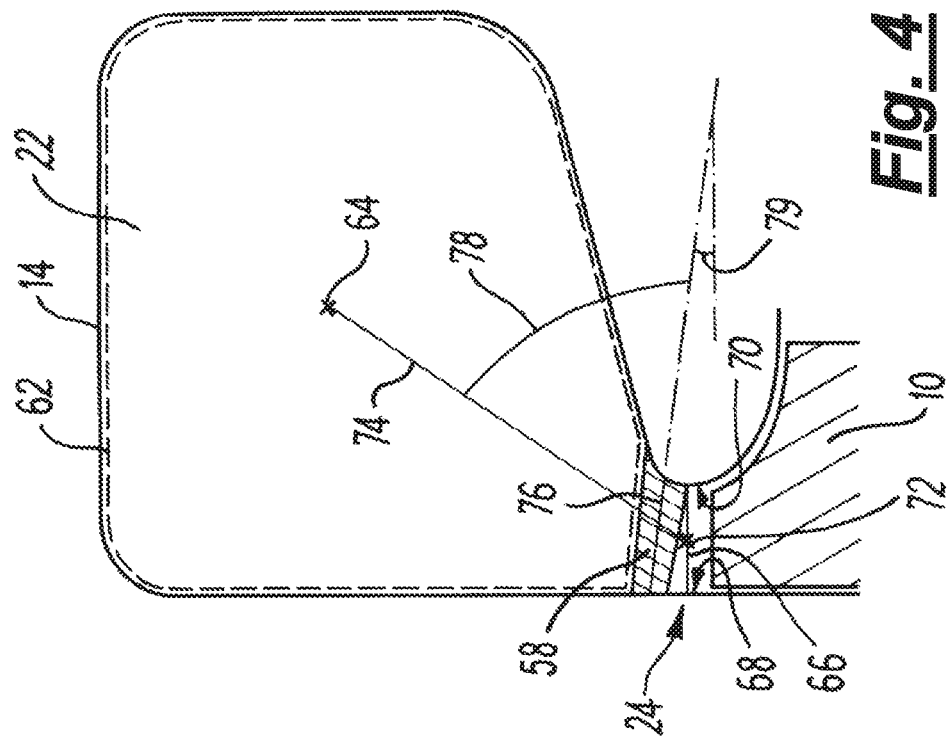
FIG. 4 shows a cross-section through an inlet volute of a turbine housing according to a first embodiment of the disclosure.

FIG. 4 shows a cross-section of an inlet volute 14 according to a first embodiment of the disclosure. The volute of FIG. 4 is the same as the volute of FIG. 3 with the exception of the configuration of the tongue, therefore only the differences will be discussed here.

In this embodiment, the tongue tip 58 has been adjusted so that its lateral centerline 76 is no longer parallel to the turbine axis (not shown, but horizontal from the perspective of FIG. 4), but is at an angle 79 of 8° to it. The angle 78 between the lateral centerline 76 of the tongue tip 58 and the line of passage offset 74 is now 64°. This increase in the angle 78 between the tongue tip 58 and line of passage offset 74 reduces the magnitude of the change in A/r across the tongue tip. In addition, this change in angle of the tongue tip 58 decreases its cross sectional area (from the perspective of FIG. 4, the right hand lateral end of tongue tip 58 has been moved downwards towards the throat, shortening the overall lateral width of the tongue tip), which further reduces the change in A/r.

Figure 5:
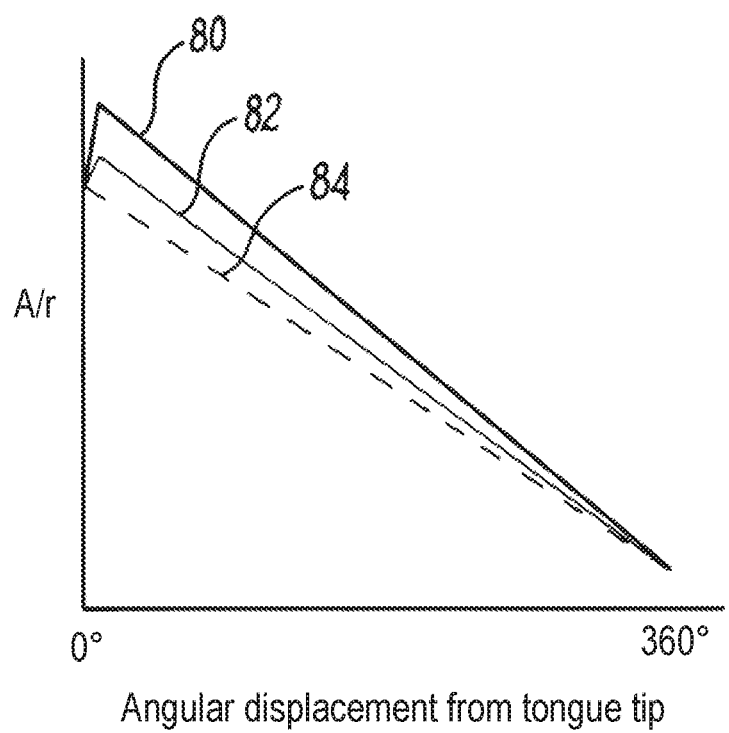
FIG. 5 shows a graph of the variation in A/r around the circumference of the throats of the volutes of FIGS. 3 and 4.

FIG. 5 illustrates the effect of this change, showing the change in A/r of the volute passage 22 as angular displacement from the tongue tip 58 increases (exaggerated for clarity) for the volute passages of FIG. 3 (line 80) and FIG. 4 (line 82). From this figure, the improvement offered by this change in tongue tip angle 78 is clear, with line 82 being nearer to the linear decrease in A/r (line 84) that is desired.

Figure 6:
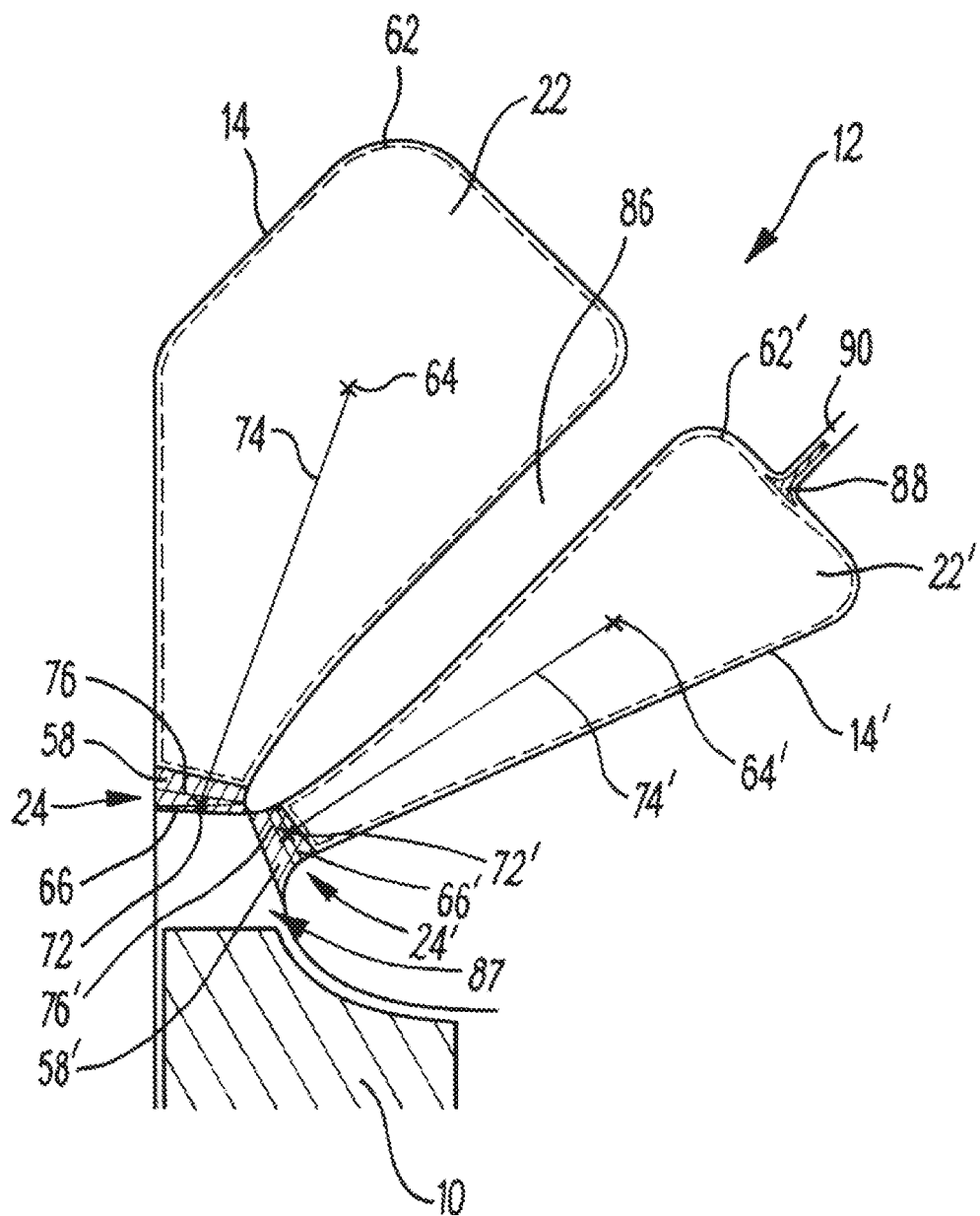
FIG. 6 shows a cross-section through an inlet volute of a turbine housing according to a second embodiment of the disclosure.

FIG. 6 shows a cross-section of an inlet volute 14 according to a second embodiment of the disclosure. Like the volute 14 of the first embodiment, it has a volute passage 22, a throat 24, and a tongue with a tip 58. The structure of these features correspond to the equivalent features of the first embodiment. As with FIGS. 3 and 4, FIG. 6 is a cross-section through a plane which contains the turbine axis (not visible) and the tongue tip 58. Again, the figure is annotated to show the preliminary inlet area 62 and its centroid 64, the line of minimum clearance 66 and its mid-point 72, and the lateral centerline 76 of the tongue tip 58. In this embodiment, the angle (not shown) between the lateral centerline 76 of the tongue tip 58 and the line of passage offset 74 is 78°.

In the second embodiment, the turbine housing 12 has an additional volute 14' with an additional volute passage 22' separated from the volute passage 22 by a dividing wall 86. The additional volute 14' also has an additional throat 24' and an additional tongue with an additional tongue tip 58'. The additional tongue tip 58' has a lateral centerline 76'. The features of the additional inlet volute 14' have equivalent structure and function to those of the inlet volute 14. The two volute passages 22, 22' meet at an inlet passage 87 positioned immediately radially outwards from the turbine wheel 10. In this embodiment, the volute passage 22 and the additional volute passage 22' are both inclined from the radial direction. More particularly, in this case both passages 22, 22' are inclined from the radial direction in the same axial direction—both are inclined to the right from the perspective of FIG. 6. This may provide an advantageous amount of space to the other axial side of the turbine housing, which may for example allow a particularly large bearing housing to be accommodated (or may allow particularly uninhibited access to the bearing housing).

The plane of FIG. 6 is also a plane which includes the turbine axis and the additional tongue tip 58', and in this plane the additional volute passage, throat and tongue tip 22', 24', 58' define (in a corresponding manner) an additional preliminary inlet area 62' with a centroid 64', an additional line of minimum clearance 66' with a mid-point 72', and a line of additional passage offset 74'. In this embodiment the angle (not labelled) between the additional tongue tip lateral centerline 76' and the line of additional passage offset 74' is 90°. In other words, the additional tongue tip lateral centerline 76' is perpendicular to the line of additional passage offset 74'.

In the second embodiment, the tongue tip 58 is positioned in the throat 24 such that the line of minimum clearance 66 runs through (i.e. lies within) the tongue tip, and similarly the additional tongue tip 58' is positioned in the additional throat 24' such that the additional line of minimum clearance 66' runs through the additional tongue tip. It is also apparent that the additional tongue tip lateral centerline 76' is near parallel (5°) to the additional line of minimum clearance 66'. Further, it is noteworthy that the additional preliminary inlet area 62' is smaller than the preliminary inlet area 62.

In this case, the additional preliminary inlet area 62' is around half the size of the preliminary inlet area 62 (in other words the magnitudes of the two areas differ from one another by around 50% of the larger area). In this case the additional line of minimum clearance 66' is around two thirds the length of the line of minimum clearance 66. In other words the line of minimum clearance 66 and the additional line of minimum clearance 66' differ in length from one another. In this case the additional line of minimum clearance 66' is shorter than the line of minimum clearance 66, but in other embodiments it may be longer. Further, although in this case the difference in magnitudes of the two lines of minimum clearance is around 33% of the length of the larger, in other embodiments this difference may be more than this (for instance 40%) of less than this (for instance 20%).

In this embodiment, due to its smaller size the pressure is greater in the additional volute passage 22'. The pressure in the additional volute passage 22' is therefore higher, and this can be utilized in an EGR system by opening a valve 88 and releasing some of the exhaust gas in the additional volute passage back into the engine through a recirculation duct 90. In an alternative embodiment, the valve 88 and duct 90 may be used as a wastegate.

Figure 7:
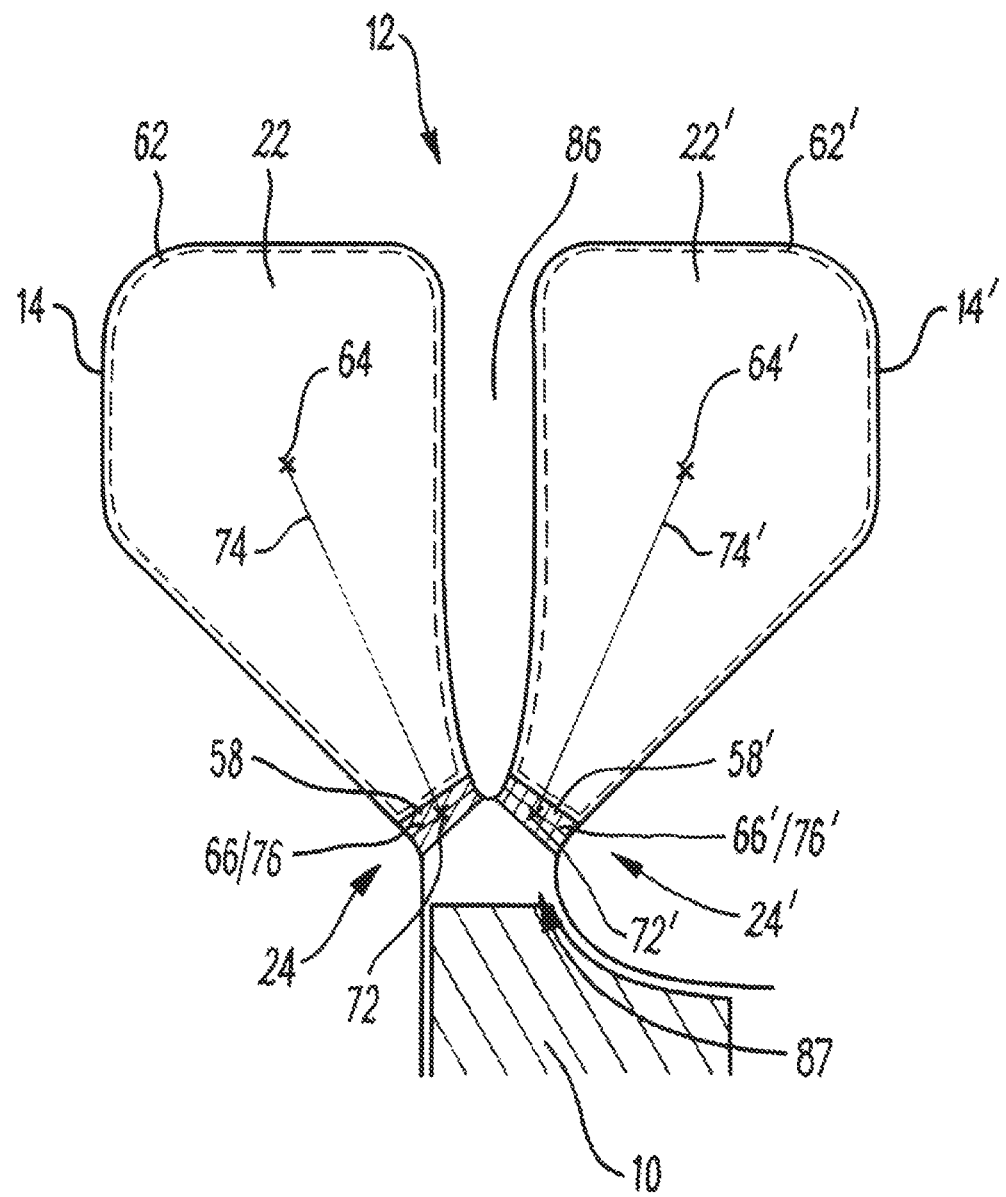
FIG. 7 shows a cross-section through an inlet volute of a turbine housing according to a third embodiment of the disclosure.

A cross-section of an inlet volute 14 according to a third embodiment of the disclosure is shown in FIG. 7. Like the second embodiment, the housing 12 of the third embodiment has an inlet volute 14 and an additional inlet volute 14' which meet at an inlet passage 87. Only the differences between the second and third embodiments will be described here.

While in the first and second embodiments the volute 14 or volutes 14, 14' were all angled to the right (from the perspective of the figures) away from the radial direction in order to provide access to a bearing housing, this is not the case in the third embodiment. In this case, the inlet volute 14 and the additional inlet volute 14' are angled away from the radial direction in opposite axial directions—the inlet volute 14 is inclined to the left and the additional inlet volute 14 is inclined to the right (from the perspective of FIG. 7). Nonetheless, since each of the two volutes 14, 14' are individually offset relative to their respective throats (i.e. neither the line of passage offset 74 nor the additional line of passage offset 74' are perpendicular to the turbine axis), albeit in opposite directions, the disclosure may nonetheless be of benefit to each volute passage 22, 22' individually.

In the third embodiment, the volute passage 22 and additional volute passage 22' are mirror-images of each other about a plane normal to the turbine axis. Similarly, unlike the second embodiment, in the third embodiment the throat 24 and additional throat 24' have the same minimum clearance. In other words, the line of minimum clearance 66 and the additional line of minimum clearance 66' are the same length.

In addition, in this embodiment the tongue tip lateral centerline 76 is collinear with the line of minimum clearance 66, and the additional tongue tip lateral centerline 76' is collinear with the additional line of minimum clearance 66'. In this embodiment the angle between the tongue tip lateral centerline 76 and the line of passage offset 74, is 76°, as is the angle between the additional tongue tip lateral centerline 76' and the additional line of passage offset 74'.

Figure 8:
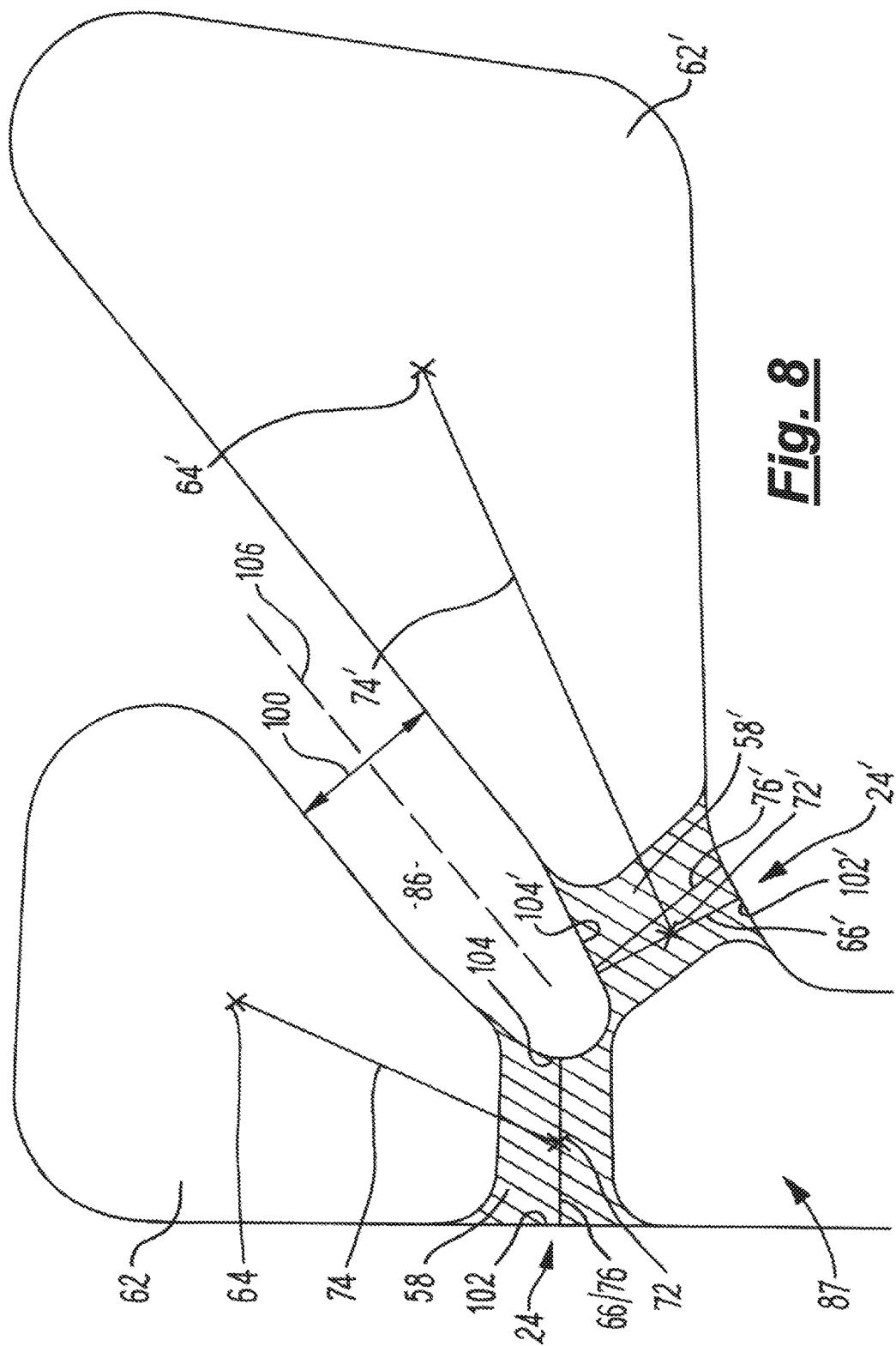
FIG. 8 shows a cross-section of the preliminary inlet areas of a turbine housing according to a fourth embodiment of the disclosure.

FIG. 8 shows the preliminary inlet area 62 and additional preliminary inlet area 62' of a turbine housing according to a fourth embodiment of the disclosure. FIG. 8 is a magnified view but is shown to scale. As an indication of the actual size of the fourth embodiment, the width 100 of the dividing wall is 6 mm. The turbine axis is not visible, but is horizontal from the perspective of FIG. 8, with the bearing housing and the mounting surface of the turbine housing (not visible) positioned to the left. The fourth embodiment is similar to the second embodiment, therefore only the differences will be described here.

In the fourth embodiment, the preliminary inlet area 62 is smaller than the additional preliminary inlet area 62', in this case by a factor of around 2 (however, as explained below, the selection of the preliminary inlet area and the additional preliminary inlet area may be reversed). In other words, their magnitudes differ from one another by around 50% of the larger of the two areas. The inlet volutes (not visible) are positioned such that the line of passage offset 74 is at an angle of around 68 degrees to the turbine axis, and such that the line of additional passage offset 74' is positioned at an angle of around 24 degrees to the turbine axis. It is also noteworthy that the tongue tip lateral centerline 76 is collinear with the line of minimum clearance 66, as was the case in the third embodiment. In this embodiment, the additional tongue tip lateral centerline 76' is not collinear with the additional line of minimum clearance 66. Rather, they are positioned at an angle of around 10 degrees to one another.

In this embodiment, the angle between the tongue tip lateral centerline 76 and the line of passage offset 74 is around 68 degrees, and the angle between the additional tongue tip lateral centerline 76' and the line of additional passage offset 74' is around 75 degrees. In this embodiment the tongue tip 58 and additional tongue tip 58' are each laterally tapered, in this case each having an even taper of around 2 degrees, for ease of manufacture. Each tongue tip 58, 58' narrows towards the dividing wall 86. In this embodiment, the tongue tip lateral centerline 76 is substantially parallel to the turbine axis (not visible), as is the line of minimum clearance 66, the additional tongue tip lateral centerline 76' is positioned at an angle of around 50 degrees to the turbine axis and the additional line of minimum clearance 66' is positioned at an angle of around 60 degrees to the turbine axis. In this embodiment, the line of minimum clearance 66 and the additional line of minimum clearance 66' are of substantially the same length. In this case, each is around 6 mm long.

The tongue tip lateral centerline 76 meets the first wall 102 of the throat 24 at an angle of around 90 degrees, and also meets the second wall 104 of the throat at an angle of around 90 degrees. Accordingly, the sum of the angle at which the tongue tip lateral centerline 76 intersects the first wall 102, and the angle at which the tongue tip lateral centerline intersects the second wall 104, is around 180 degrees. The additional tongue tip lateral centerline 76' meets the first wall 102' of the additional throat 24' at an angle of around 78 degrees, and meets the second wall 104' of the additional throat 24' at an angle of around 78 degrees. Therefore, the sum of the angle at which the additional tongue tip lateral centerline 76' intersects the first wall 102', and the angle at which the additional tongue tip lateral centerline intersects the second wall 104', is around 156 degrees. Although in this case the tongue tip lateral centerline 76 meets both walls 102, 104 at substantially the same angle and the additional tongue tip lateral centerline 76' meets both walls 102', 104' at substantially the same angle, this is a result of the particular geometry of the throats 24, 24' of the fourth embodiment. In other embodiments this may not be the case.

In this embodiment, the wall described as the 'first' wall 102 is the wall of the throat 24 which is axially nearer to the mounting surface (not visible), and the second wall 104 is the wall of the throat 24 which is defined by the dividing wall 86. Further, the first wall 102 is the wall on the side of the throat 24 at which the tongue tip 58 is thicker due to its lateral taper. The first wall 102' is the wall of the additional throat 24' that is axially further from the mounting surface (not visible), and is also the wall of the additional throat 24' which is not defined by the dividing wall 86. The first wall 102' is also the wall on the side of the additional throat 24' at which the additional tongue tip 58' is thicker due to its lateral taper. In the case of both volute passages, it is to be understood that in other embodiments the 'first' and 'second' walls of the throat in question may be designated in any suitable fashion, for instance one or more of those described in the appended claims.

In this embodiment, the dividing wall 86 is positioned with its centerline 106 at an angle of around 40 degrees to the turbine axis. The line of minimum clearance 66 and the tongue tip lateral centerline 76 (which are collinear, as outlined above) are each positioned at an angle of around 40 degrees to the centerline 106 of the dividing wall 86. The additional tongue tip lateral centerline 76' is positioned at an angle of around 90 degrees to the centerline 106 of the dividing wall 86, and the additional line of minimum clearance 66' is positioned at an angle of around 80 degrees to the centerline 106 of the dividing wall 86. It will be readily apparent from FIG. 8 that in the case of the fourth embodiment, the line of minimum clearance runs through the tongue tip and the additional line of minimum clearance runs through the additional tongue tip.

Although in this embodiment the additional tongue tip lateral centerline 76' is positioned substantially perpendicularly to the centerline 106 of the dividing wall 86, in one modification of the fourth embodiment it is instead positioned substantially perpendicularly to the first wall 102' and second wall 104' of the additional throat 24'. In this modification, due to the particular geometry of the additional throat 24', the additional tongue tip lateral centerline 76' would be substantially parallel to (and indeed collinear with) the additional line of minimum clearance 66'. In this modification the additional tongue tip lateral centerline 76' would be positioned at an angle of around 86 degrees to the line of additional passage offset 74', and positioned at an angle of around 80 degrees to the to the centerline 106 of the dividing wall 86.

Numerous modifications and variations may be made to the exemplary designs described above without departing from the scope of the disclosure as defined in the claims. For instance, though in the above embodiments the line of additional passage offset is not perpendicular to the turbine axis and the additional tongue tip lateral centerline is at an angle of not less than 60° with the line of additional passage offset, in other embodiments the additional inlet volute may be entirely conventional.

Furthermore, whilst the turbine housing described forms part of a turbine assembly in a turbocharger, it will be appreciated that this need not be the case. For example, the housing may be fitted to a turbine assembly that is to be linked to a crankshaft and/or gear which transmits mechanical power to a flywheel or a power generating device.

It is to be noted that features or arrangements described in relation to the additional inlet volute may be present in relation to the volute passage (instead or in addition), and vice versa. For the avoidance of doubt, as both inlet volutes in the second, third and fourth embodiments fall within the scope of the appended claims, the selection of which inlet volute constitutes the additional inlet volute is arbitrary. In both cases the two volutes may be categorised the other way round, i.e. with the additional inlet volute being on the left from the perspective of the figures. In the illustrations of the above embodiments each tongue tip has a slight taper along its lateral centerline. While this feature may be preferable for manufacturing reasons, as it allows easier removal of the mould during casting, it should not be construed as limiting.

Although the first and second aspects of the disclosure have been discussed in detail in relation to different embodiments, it is to be understood that the arrangements described may also be embodiments of other aspects of the disclosure. For example, in relation to the first embodiment (illustrated in FIG. 4), if the wall of the throat 24 to the right from the perspective of the diagram is designated the 'first wall' and the opposite wall of the throat is designated the 'second wall', the tongue tip lateral centerline 76 intersects the first wall at an angle of around 65 degrees and intersects the second wall at an angle of around 82 degrees. Accordingly, the sum of said angles is around 147 degrees. Although the wall to the right of the throat (from the perspective of FIG. 4) has been designated as the 'first wall' in this example, since it is the wall of the throat at which the tongue tip is thicker) and is the wall of the throat which is further from the mounting surface, as outlined above this should not be construed as limiting. This wall may equally be designated the 'second wall' and the other wall the 'first wall'.

It should be noted that the above embodiments are also within the scope of the fifth aspect of the disclosure.

While the inventions have been illustrated and described in detail in the drawings and foregoing description, the same is to be considered as illustrative and not restrictive in character, it being understood that only exemplary embodiments have been shown and described and that all changes and modifications that come within the scope of the invention as defined in the claims are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the disclosure, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. For the avoidance of doubt, optional and/or preferred features as set out herein may be used either individually or in combination with each other where appropriate and particularly in the combinations as set out in the accompanying claims. The optional and/or preferred features for each aspect of the disclosure set out herein are also applicable to any other aspects of the disclosure, where appropriate.

The invention claimed is:

1. A turbine housing comprising a cavity for a turbine wheel, the cavity defining a turbine axis about which the turbine wheel rotates in use, and an inlet volute comprising:
   a volute passage spiralling radially inwards about the turbine axis from a first end to a second end;
   a substantially annular throat positioned between a radially inner portion of the volute passage and a radially outer portion of the cavity to provide fluid communication therebetween, the throat being defined between first and second axially-spaced walls;
   a tongue projecting between a radially outer portion of the second end of the volute passage and a radially inner portion of a part of the volute passage radially outboard thereof, the tongue terminating at a distal tongue tip, wherein the volute passage, throat and tongue tip are positioned whereby in a plane containing the turbine axis and the tongue tip:
   the throat defines a line of minimum clearance, which is a line running between the points on the first and second walls which are the closest together;
   the volute passage and tongue tip co-operatively define a preliminary inlet area;
   the line of minimum clearance and the preliminary inlet area co-operatively define a line of passage offset, which connects the centroid of the preliminary inlet area and a point half way along the line of minimum clearance;
   the tongue tip defines a tongue tip lateral centerline, being a central line extending laterally across the tongue tip;
   the line of passage offset is not perpendicular to the turbine axis;
   a thickness of the tongue tip, perpendicular to the tongue tip lateral centreline, enlarges from the first wall to the second wall; and
   the tongue tip lateral centreline and the line of passage offset define an angle therebetween of at least 60 degrees.

2. A turbine housing according to claim 1 wherein the tongue tip lateral centreline and the line of passage offset define an angle therebetween of at least 75 degrees.

3. A turbine housing according to claim 1 wherein the sum of the angle at which the tongue tip lateral centreline intersects the first wall, and the angle at which the tongue tip lateral centreline intersects the second wall, is at least 120 degrees.

4. A turbine housing comprising a cavity for a turbine wheel, the cavity defining a turbine axis about which the turbine wheel rotates in use, and an inlet volute comprising:
    a volute passage spiralling radially inwards about the turbine axis from a first end to a second end;
    a substantially annular throat positioned between a radially inner portion of the volute passage and a radially outer portion of the cavity to provide fluid communication therebetween, the throat being defined between first and second axially-spaced walls;
    a tongue projecting between a radially outer portion of the second end of the volute passage and a radially inner portion of a part of the volute passage radially outboard thereof, the tongue terminating at a distal tongue tip, wherein the volute passage, throat and tongue tip are positioned whereby in a plane containing the turbine axis and the tongue tip:
    the throat defines a line of minimum clearance, which is a line running between the points on the first and second walls which are the closest together;
    the tongue tip defines a tongue tip lateral centerline, being a central line extending laterally across the tongue tip;
    a thickness of the tongue tip, perpendicular to the tongue tip lateral centerline, enlarges from the first wall to the second wall; and
    the sum of the angle at which the tongue tip lateral centreline intersects the first wall, and the angle at which the tongue tip lateral centreline intersects the second wall, is at least 120 degrees.

5. A turbine housing according to claim 4 wherein said sum is at least 150 degrees.

6. A turbine housing according to claim 5 wherein the tongue tip lateral centreline is positioned substantially perpendicularly to the first wall, at a location at which it is as close to perpendicular to the second wall as possible.

7. A turbine housing according to claim 4 wherein the tongue tip lateral centreline is positioned at an angle of at least 75 degrees to the first wall.

8. A turbine housing according to claim 4 wherein the tongue tip lateral centreline is positioned at an angle of at least 75 degrees to the second wall.

9. A turbine housing according to claim 4 wherein the tongue tip is laterally tapered, and a portion of the tongue tip which is adjacent to the first wall is thicker than a portion which is adjacent to the second wall.

10. A turbine housing according to claim 4 wherein the turbine housing has a mounting surface configured to be positioned against a bearing housing, and the first wall is positioned axially further from the mounting surface than the second wall.

11. A turbine housing according to claim 1 wherein the tongue tip lateral centreline is at an angle of 15 degrees or less to the line of minimum clearance.

12. A turbine housing according to claim 1 wherein the line of minimum clearance lies substantially within the tongue tip.

13. A turbine housing according to claim 12, wherein the tongue tip lateral centreline is at an angle of 15 degrees or less to the line of minimum clearance and further wherein the line of minimum clearance and the tongue tip lateral centreline are substantially collinear.

14. A turbine according to claim 1 wherein the tongue tip lateral centreline is at an angle of 15 degrees or less to the turbine axis.

15. A turbine housing according to claim 1 further comprising an additional inlet volute with an additional volute passage spiralling radially inwards about the turbine axis from a first end to a second end, the volute passage and the additional volute passage being separated by a dividing wall.

16. A turbine housing according to claim 15 wherein the dividing wall defines the second wall of the throat.

17. A turbine housing according to claim 15 further comprising:
    a substantially annular additional throat positioned between a radially inner portion of the additional volute passage and a radially outer portion of the cavity to provide fluid communication therebetween, the additional throat being defined between first and second axially-spaced walls;
    an additional tongue projecting between a radially outer portion of the second end of the additional volute passage and a radially inner portion of a part of the additional volute passage radially outboard thereof, the additional tongue terminating at a distal additional tongue tip, wherein the additional volute passage, additional throat and additional tongue tip are positioned whereby in a plane containing the turbine axis and the additional tongue tip:
    the additional throat defines an additional line of minimum clearance, which is a line running between the points on the first and second walls of the additional throat which are the closest together;
    the additional volute passage and the additional tongue tip co-operatively define an additional preliminary inlet area;
    the additional line of minimum clearance and the additional preliminary inlet area co-operatively define a line of additional passage offset, which connects the centroid of the additional preliminary inlet area and a point half way along the additional line of minimum clearance;
    the additional tongue tip defines an additional tongue tip lateral centreline;
    the line of additional passage offset is not perpendicular to the turbine axis; and
    the additional tongue tip lateral centreline and the line of additional passage offset define an angle therebetween of at least 60 degrees.

18. A turbine housing according to claim 17 wherein the sum of the angle at which the additional tongue tip lateral centreline intersects the first wall of the additional throat, and the angle at which the additional tongue tip lateral centreline intersects the second wall of the additional throat, is at least 120 degrees.

19. A turbine housing according to claim 15 further comprising:
    a substantially annular additional throat positioned between a radially inner portion of the additional volute passage and a radially outer portion of the cavity to provide fluid communication therebetween, the additional throat being defined between first and second axially-spaced walls;
    an additional tongue projecting between a radially outer portion of the second end of the additional volute passage and a radially inner portion of a part of the additional volute passage radially outboard thereof, the additional tongue terminating at a distal additional tongue tip, wherein the additional volute passage, additional throat and additional tongue tip are positioned whereby in a plane containing the turbine axis and the additional tongue tip:

the additional tongue tip defines an additional tongue tip lateral centreline;

the line of additional passage offset is not perpendicular to the turbine axis; and the sum of the angle at which the additional tongue tip lateral centreline intersects the first wall of the additional throat, and the angle at which the additional tongue tip lateral centreline intersects the second wall of the additional throat, is at least 120 degrees.

20. A turbine assembly comprising a turbine wheel, and a turbine housing according to claim 1.

21. A turbocharger comprising a turbine assembly according to claim 20.

* * * * *